(12) United States Patent
Strei

(10) Patent No.: US 9,157,824 B2
(45) Date of Patent: Oct. 13, 2015

(54) HIGH PRESSURE FLUID COUPLING

(71) Applicant: Rosemount Inc., Chanhassen, MN (US)

(72) Inventor: David Matthew Strei, Waconia, MN (US)

(73) Assignee: Rosemount Inc., Chanhassen, MN (US)

( * ) Notice: Subject to any disclaimer, the term of this patent is extended or adjusted under 35 U.S.C. 154(b) by 274 days.

(21) Appl. No.: 13/630,641

(22) Filed: Sep. 28, 2012

(65) Prior Publication Data

US 2014/0090478 A1 Apr. 3, 2014

(51) Int. Cl.
*G01L 7/00* (2006.01)
*G01L 19/00* (2006.01)
*F16L 19/02* (2006.01)
*F16L 19/07* (2006.01)

(52) U.S. Cl.
CPC ......... *G01L 19/0007* (2013.01); *F16L 19/0206* (2013.01); *F16L 19/07* (2013.01)

(58) Field of Classification Search
CPC ....... G01L 9/00; G01L 9/0007; G01L 9/0084; F16K 27/003
USPC .............. 285/212, 219, 334.4, 604, 147, 131; 73/204, 756, 715, 753, 700, 706; 137/884
See application file for complete search history.

(56) References Cited

U.S. PATENT DOCUMENTS

| | | | |
|---|---|---|---|
| 3,362,731 A | 1/1968 | Gasche et al. | 285/212 |
| 4,974,308 A * | 12/1990 | Nimberger | 29/469 |
| 5,172,939 A | 12/1992 | Hashimoto | |
| 8,042,401 B2 * | 10/2011 | Broden | 73/723 |
| 2006/0284421 A1 | 12/2006 | Fonville et al. | |
| 2007/0145740 A1 | 6/2007 | Jou | |

(Continued)

FOREIGN PATENT DOCUMENTS

| | | |
|---|---|---|
| CN | 1880824 | 12/2006 |
| CN | 101718378 | 6/2010 |

(Continued)

OTHER PUBLICATIONS

Communication from European Patent Application No. 13723606.3, dated May 7, 2015.

(Continued)

*Primary Examiner* — Lisa Caputo
*Assistant Examiner* — Nigel Plumb
(74) *Attorney, Agent, or Firm* — Westman, Champlin & Koehler, P.A.

(57) ABSTRACT

A process fluid pressure sensing system includes a process fluid pressure transmitter and a process manifold. The process fluid pressure transmitter has first and second pressure inlets and is configured to obtain a measurement relative to pressures applied at the first and second pressure inlets and provide a process variable output based on the measurement. The process manifold is operably coupled to a process fluid and has first and second pressure outlets. A first high-pressure coupling joins the first pressure outlet of the process manifold to the first pressure inlet of the process fluid pressure transmitter. A second high-pressure coupling joins the second pressure outlet of the process manifold to the second pressure inlet of the process fluid pressure transmitter. The first and second high-pressure fluid couplings are configured to accommodate misalignment between the respective pressure outlets and inlets.

14 Claims, 9 Drawing Sheets

(56) References Cited

U.S. PATENT DOCUMENTS

2010/0084856 A1 4/2010 Wrobel et al.
2012/0079884 A1* 4/2012 Broden et al. .................. 73/717

FOREIGN PATENT DOCUMENTS

| CN | 102278553 | 12/2011 |
| CN | 202149303 | 2/2012 |

OTHER PUBLICATIONS

Office Action from Chinese Patent Application No. CN 2012105166061, dated Mar. 19, 2015.
Notification of Transmittal of The International Search Report and The Written Opinion of the International Searching Authority, or the Declaration dated Mar. 31, 2014 in related International Application No. PCT/US2013/038986, filed May 1, 2013. 9 pgs.

* cited by examiner

HIGH PRESSURE FLUID COUPLING

BACKGROUND

Process pressure transmitters are used to monitor pressure of process fluids used in industrial processes. Process pressure transmitters include a pressure sensor that typically provides an electrical output in response to a change in process fluid pressure. Each process pressure transmitter includes transmitter electronics for receiving and processing the electrical output of the pressure sensor. The transmitter electronics are also typically configured to transmit a signal, digital, analog, or a combination thereof, over a control loop or network to a central monitoring location such as a control room.

Pressure sensors used in pressure transmitters generally include a flexible sensor element, such as an electrode plate or a piezo-resistor that deflects in response to a pressure change. The sensor element is fluidically coupled to the process fluid typically through an isolation system. The isolation system includes a metal diaphragm that is configured to contact the process fluid. The isolation system also includes a sealed passageway that extends from the isolator diaphragm to the pressure sensor. The sealed passageway is typically filled with a substantially incompressible fill fluid such as silicone oil. As the pressure of the process fluid changes, the position of the isolator diaphragm changes thereby transferring a pressure change through the isolation fluid to the pressure sensor element. When the pressure sensor element moves in response to the pressure change, a corresponding change in an electrical characteristic of the pressure sensor, such as capacitance or resistance, changes as well. The electrical characteristic of the pressure sensor element is measured by the pressure transmitter electronics and is used to compute the pressure of the process fluid.

Differential pressure transmitters are used in a variety of applications where a difference between two pressures must be measured. Examples of such applications include level measurement in a container and flow measurement across a differential pressure producer such as an orifice plate or venturi. Differential pressure sensors typically require two isolation systems to convey separate process pressures to opposite sides of a single differential pressure sensor element. Typically, a differential pressure transmitter is installed with an integral manifold/valve body that enables both zero calibration of the transmitter and removal/replacement of the transmitter without having to shut off pressure to the transmitter/manifold assembly. The interface between the transmitter and the manifold is defined by International Standard IEC 61518, entitled "Mating dimensions between differential pressure (type) measuring instruments and flanged-on shut-off devices up to 413 BAR (41.3 MPa)."

FIG. 1 is a diagrammatic view of a process fluid differential pressure transmitter coupled to a manifold assembly in accordance with the International Standard set forth above. Transmitter 10 is coupled to manifold 12 by four bolts (not shown) that extend from surface 16 of manifold 12 into transmitter 10. By using the four bolts, no fittings or additional hardware are used or required to hold the assembly together. This arrangement provides for simple assembly by the end user.

It is sometimes desirable to connect differential pressure transmitters to processes having extremely high static pressures. For example, deeply penetrating oil wells require large line pressures to transport the oil to surface levels. In applications above 413 bar, the manifolds tend to be spaced from the differential pressure transmitter with impulse piping or lines coupling the manifold to the differential pressure transmitter. This is due, at least on part, to the stresses that would be placed on the four clamping bolts if the differential pressure transmitter were bolted directly to the manifold. Given that known isolator diaphragms can exceed 0.8 inches in diameter and that two such isolators are required for differential pressure measurement, a static pressure of 10,000 psi can generate a pressure on the bolts in excess of 5,000 pounds.

FIG. 2 is a diagrammatic view of a differential pressure transmitter coupled to a manifold that is suitable for applications that exceed line pressures of 413 bar. Differential pressure transmitter 20 is coupled to manifold 22 via a pair of impulse lines 24, 26. The fluidic couplings between manifold 22 and impulse lines 24, 26 and between the impulse lines 24, 26 and differential pressure transmitter 20 are generally configured to support high line pressure. For example, such couplings sometimes use tapered fittings of the type disclosed in U.S. Pat. No. 3,362,731. However, current high pressure coupling systems require the user to route the impulse piping between the manifold and the differential pressure transmitter and to employ fittings on each end of each impulse line. Providing a high-pressure fluidic coupling system that could better accommodate coupling short runs of impulse piping would facilitate installation of differential pressure transmitters in high line pressure applications.

SUMMARY

A process fluid pressure sensing system includes a process fluid pressure transmitter and a process manifold. The process fluid pressure transmitter has first and second pressure inlets and is configured to obtain a measurement relative to pressures applied at the first and second pressure inlets and provide a process variable output based on the measurement. The process manifold is operably coupled to a process fluid and has first and second pressure outlets. A first high-pressure coupling joins the first pressure outlet of the process manifold to the first pressure inlet of the process fluid pressure transmitter. A second high-pressure coupling joins the second pressure outlet of the process manifold to the second pressure inlet of the process fluid pressure transmitter. The first and second high-pressure fluid couplings are configured to accommodate misalignment between the respective pressure outlets and inlets.

DETAILED DESCRIPTION

While embodiments of the present invention will generally be described with respect to a differential pressure transmitter, those skilled in the art will appreciate that embodiments of the present invention are practicable with any high-pressure fluid coupling application where precise axial alignment of the fluid couplings is impossible, difficult, or simply time-consuming.

Figure 1:
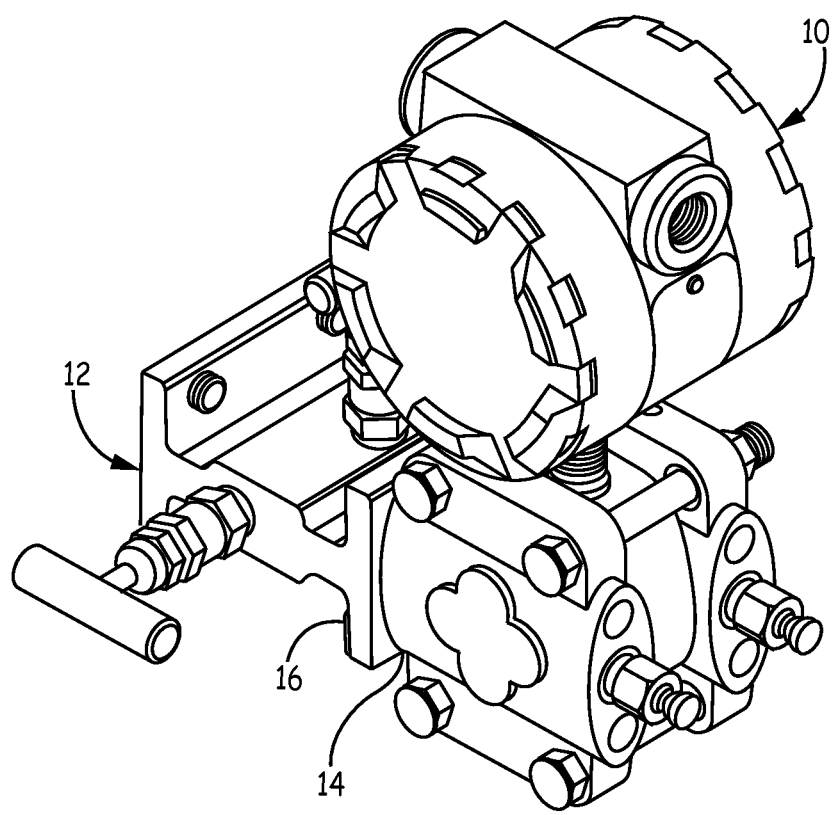
FIG. 1 is a diagrammatic view of a differential pressure transmitter coupled to a manifold assembly.
Figure 2:
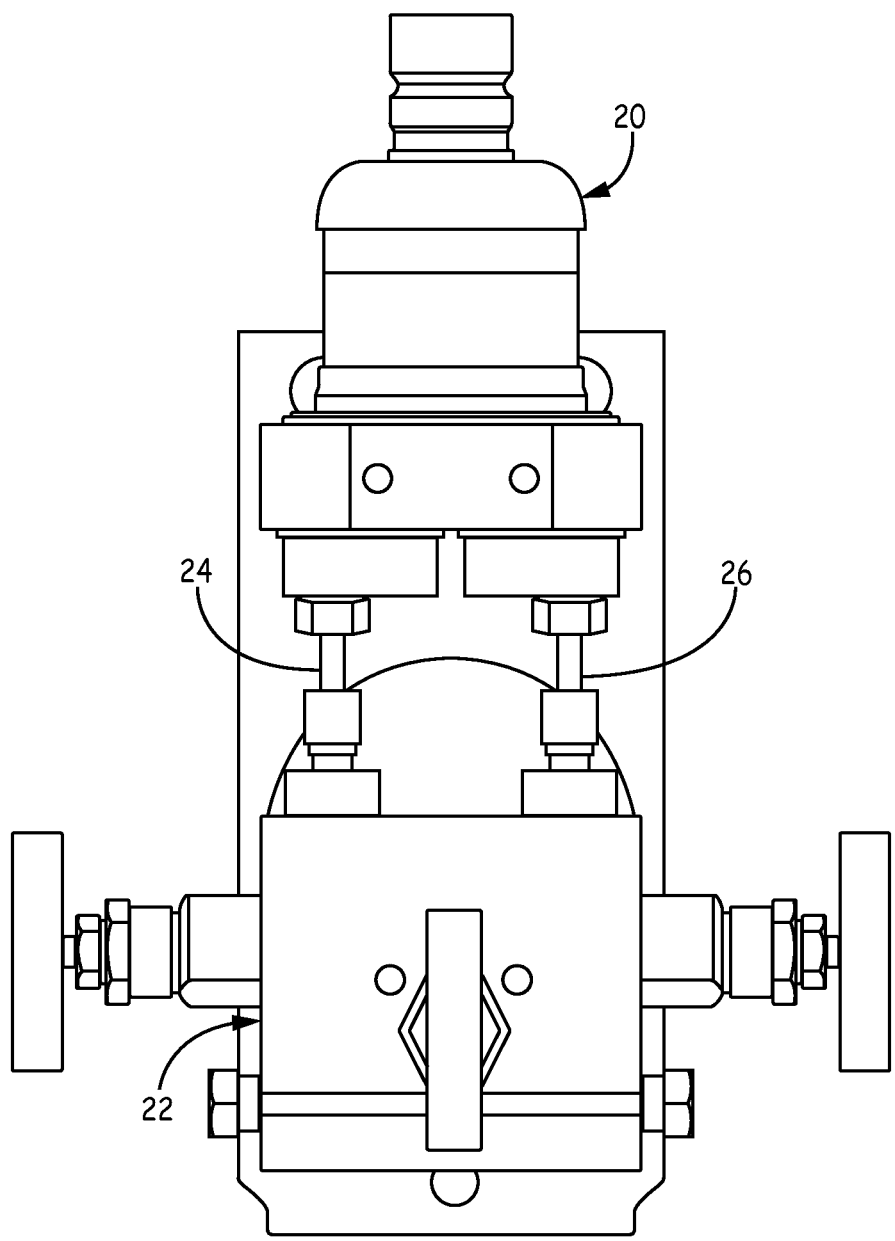
FIG. 2 is a diagrammatic view of a differential pressure transmitter coupled to a manifold that is suitable for applications that exceed line pressures of 413 bar.
Figure 3:
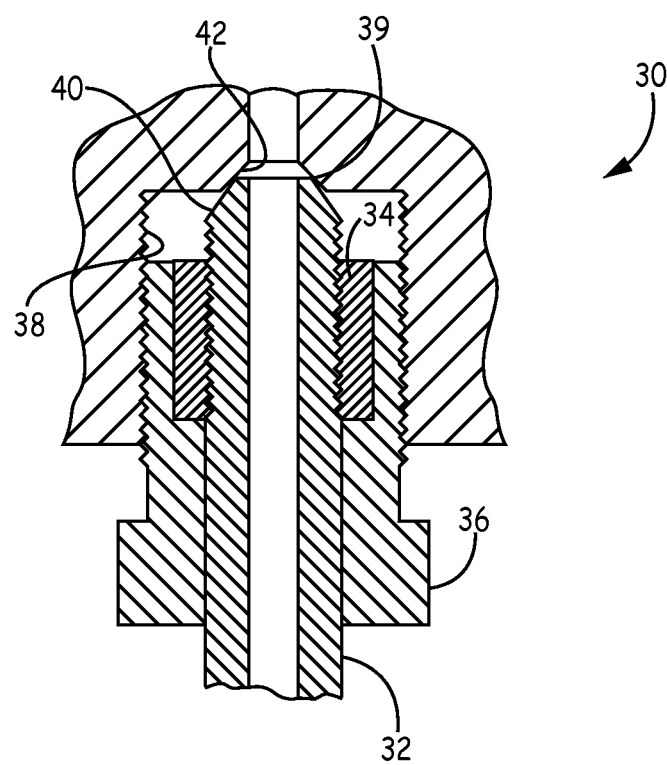
FIG. 3 is a diagrammatic view of a known high pressure fluidic coupling that uses coned and threaded fittings.

FIG. 3 is a diagrammatic view of a high pressure fluidic coupling that uses coned and threaded fittings such as are known and commercially available from such manufacturers as Parker Autoclave Engineers of Erie, Pa., and BuTech, of Burbank Calif. Typically, the high-pressure fluidic coupling consists of three components: a tube 32 with a thrust collar 34 and a gland 36 to hold tube 32 into female fitting 38. The sealing mechanism is a metal-to-metal seal 39 between cone 40 machined on the end of tube 32 and a cone 42 machined into female fitting 38. This metal-to-metal seal 39 is essentially a line contact formed by the intersection of cone 40 on the end of tube 32 and cone 42 in the female fitting 38. Collar 34 and gland 36 not only hold tube 32 into female fitting 38, but also ensure that tube 32 enters female fitting 38 at the correct angle. Precise axial alignment is required between male and female couplings in order to ensure a leak-free connection. If the collar and gland did not maintain the proper angle of the tube in the female fitting, the line contact would become two points and a gap could be caused that would allow leaks. For example, if a conical end tube is inclined 5 degrees to the axis of the coned portion of the female fitting, the seal area will consist of two points and two gaps of approximately 0.002 inches wide (for a 0.250 inch OD tube) will result. Thus, if there is any misalignment between devices that are to be coupled with coned and threaded couplings, a bend in the tubing must be provided to compensate for such misalignment. In instances where the two devices are closely-spaced, it can be difficult or even impossible to create the appropriate bends.

Figure 4:
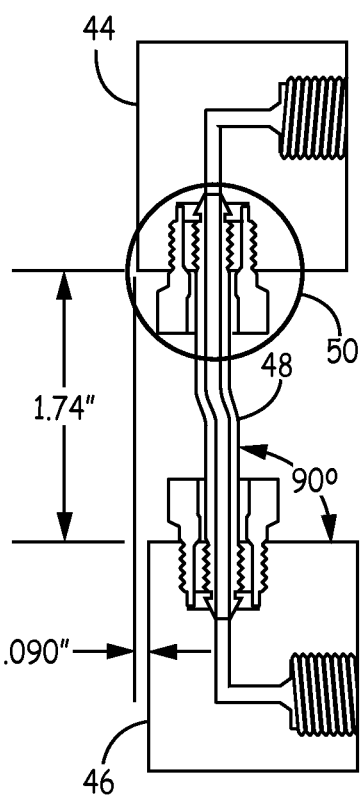
FIG. 4 is a diagrammatic view of portions of two devices being coupled together with known cone and threaded connections.

FIG. 4 is a diagrammatic view of portions of two devices being coupled together with known cone and threaded connections. Device 44 is separated from device 46 by approximately 1.74 inches. The two devices 44, 46 are to be coupled with a known cone and threaded coupling for a 0.250" outside diameter tube. As shown in FIG. 4, even a relatively small misalignment of 0.090" over a 1.74" span requires that a bend 48 be introduced into tube 32 in order to ensure that tubing 48 approaches each device 44, 46 at precisely 90 degrees. The bending step itself can be time-consuming. Moreover, since the bend results is a permanent deformation of the tubing, it is possible that improper bending operations could damage the tubing. For reference, the coupling shown at reference numeral 50 is that described above with respect to FIG. 3.

In accordance with embodiments of the present invention, a high-pressure fluidic coupling is provided that can accommodate some misalignment without requiring tubing to be bent. Embodiments of the present invention still provide the robust seal of metal-to-metal contact, but can allow the tubing to enter fitting even when not completely axially aligned with the fitting.

Figure 5:
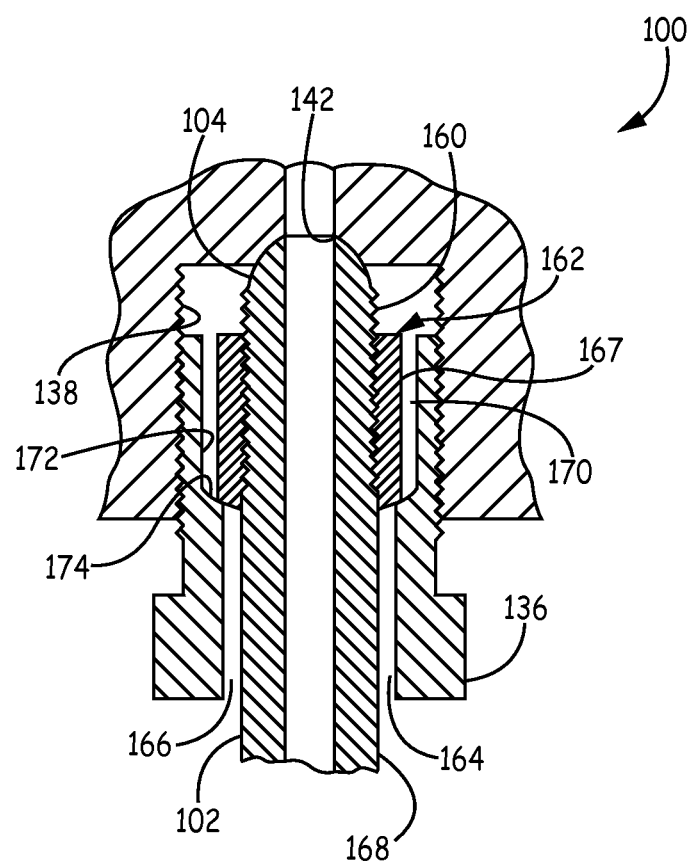
FIG. 5 is a diagrammatic view of a high pressure fluidic coupling in accordance with an embodiment of the present invention.

FIG. 5 is a diagrammatic view of a high pressure fluidic coupling in accordance with an embodiment of the present invention. Coupling 100 includes tube 102 having spherical end 104 that is received by conical recess 142 of female fitting 138. While conical recess 142 is illustrated in FIG. 5, other geometries such as a straight bore, ellipse, or sphere can be used for the internal recess structure of female fitting 138 as long as a suitable line contact can be formed with spherical end 104. In the embodiment shown, tube 102 has an externally threaded portion 160 that receives internally threaded thrust collar 162. However, in order to accommodate slight axial misalignment, some inside dimensions of gland nut 136 have been enlarged. Specifically, internal surface 164 has a diameter that sized to provide a gap 166 between surface 164 and outside diameter 168 of tube 102. Thus, tube 102 is allowed to move within gap 166. Similarly internally threaded thrust collar 162 has an outer surface 167 with a diameter that provides a gap 170 between surface 167 and internal surface 172 of gland nut 136. Another adaptation of the gland nut/thrust collar interaction is a curved surface 174 that defines the gland nut/thrust collar interface. As, different axial misalignments are accommodated, thrust collar 162 may be slid off-center. The gaps illustrated in FIG. 5 are exaggerated for the purposes of illustration and clarity. Those skilled in the art will recognize that any suitable dimensions for the outer diameter of the thrust collar; inner diameters of the gland nut; and radius of curvature for interface 174 can be changed and adjusted as long as a robust interface 174 can be maintained to reliably cause spherical end 104 to sealingly bear against conical recess 142 at all possible misalignments.

Figure 6:
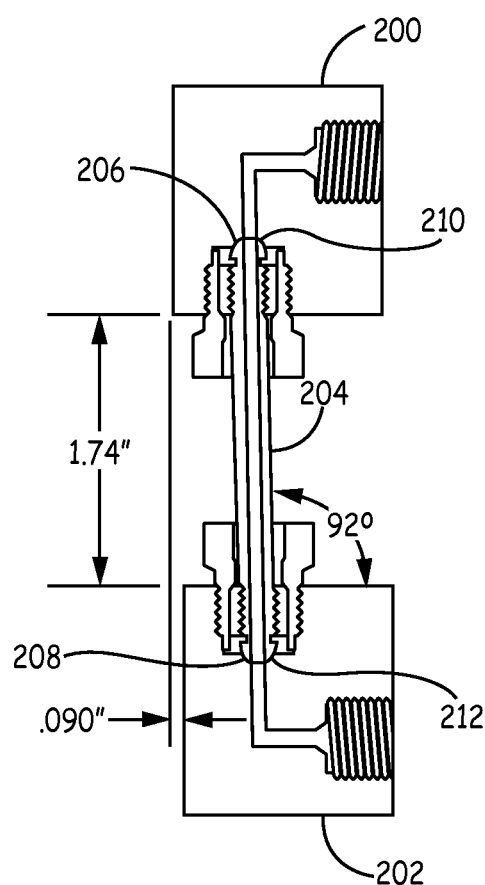
FIG. 6 is a diagrammatic view of portions of two devices being coupled together in accordance with an embodiment of the present invention.

FIG. 6 is a diagrammatic view of portions of two devices being coupled together in accordance with an embodiment of the present invention. Device 200 is coupled to device 202 through a high-pressure fluidic coupling. For contrast, the dimensions of separation and axial misalignment for FIG. 6 are identical to those of FIG. 4. FIG. 6 includes a tube 204 having spherical ends 206, 208, which are received in respective conical recesses 210, 212. Thus, each of the two fluidic connections illustrated in FIG. 6 can be in accordance with that shown with respect to FIG. 5. However, the two degree misalignment can be accommodated by the fluidic coupling without requiring a bend to be introduced into tube 204. Thus, the overall fluidic connection may require less time and effort to complete than that shown in FIG. 4.

As set forth above, embodiments of the present invention can be advantageously used to provide high-pressure fluidic couplings in a variety of applications where strict axial alignment is difficult or impossible. However, embodiments of the present invention are particularly applicable to coupling differential pressure transmitters to process fluid manifolds. While embodiments of the present invention can be used for impulse line connections, embodiments of the present invention can also enable direct coupling of a differential pressure transmitter to a process manifold for pressures exceeding 413 bar.

Figure 7:
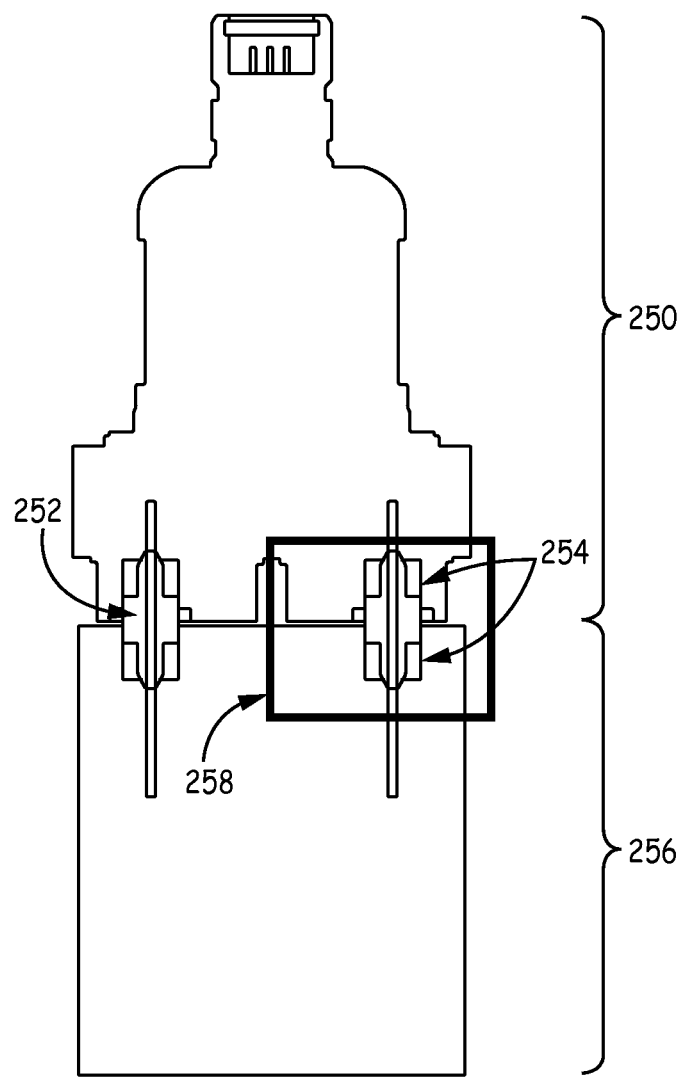
FIG. 7 is a diagrammatic cross-sectional view of a differential pressure transmitter coupled to a process manifold in accordance with an embodiment of the present invention.

FIG. 7 is a diagrammatic cross-sectional view of a process fluid pressure transmitter coupled to a process manifold in accordance with an embodiment of the present invention. Differential pressure transmitter 250 has a plurality of high-pressure fluidic couplings 252, 254 with process manifold 256. For clarity, the internal details of transmitter 250 and manifold 256 are not shown. Each coupling can include a female interface that can be in accordance with known high-pressure couplings, such as the known Autoclave FC-250 interface that provides an internal cone recess. Typically, such internal cone recess would couple to a corresponding male cone surface. However, the male portion of the coupling includes a spherical surface (shown in FIG. 8) that seals against internal cone recess of the female fitting. The arrangement still provides a robust metal-to-metal seal, but can accommodate less stringent manufacturing tolerances and surface finishes. Advantageously, the entire assembly can still be bolted together with four bolts (similar to the IEC 61518 interface). However, the bolted assembly may be rated to pressures that significantly exceed 413 bar.

Figure 8:
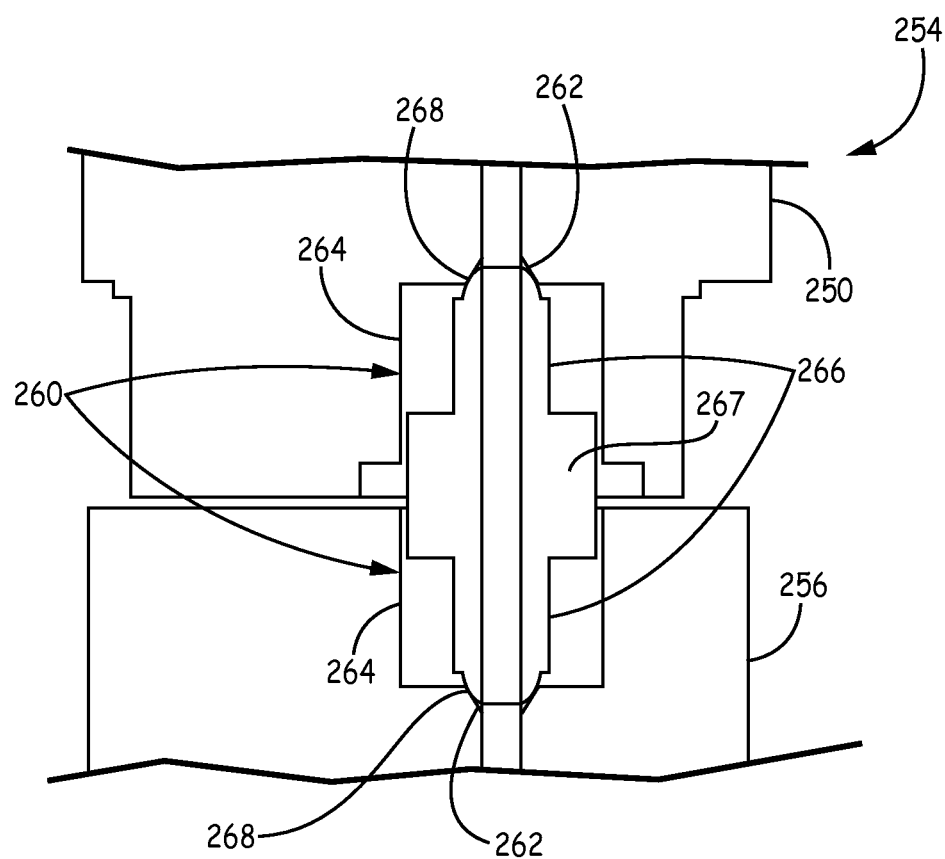
FIG. 8 is an enlarged view of a high-pressure fluidic coupling in accordance with an embodiment of the present invention.

FIG. 8 is an enlarged depiction of rectangle 258 shown in FIG. 7. Each of female connector portions 260 can be in accordance with known designs, such as those having an internal cone recess 262. Each portion 260 may also include a threaded portion 264 of female fitting 260 that is intended to mate with the male threads on a gland used in typical coned-and-threaded fittings. Alignment feature 267 uses threads 264 to center tube 266 in fitting 260 as it is brought into contact with a respective internal cone recess 262. As can be appreciated, when two or three such high-pressure fluidic couplings are required, ensuring the precise alignment of each fitting becomes very difficult. However, using seal tubes having spherical ends 268 enables seal tube 266 to enter the female fitting at a slight angle, and thus allows for manufacturing with relaxed tolerances for individual fittings on both the differential pressure transmitter and the process manifold. Another advantage provided by embodiments of the present invention is due, at least in part, to the small surface area on the ends of the tubes and the rigid nature of the tubes. Specifically, similar bolts and torques used for flanged IEC 61518 connections can be used to affix the differential pressure transmitter to the process manifold at much higher pressures. Moreover, the entire transmitter/manifold assembly can still be bolted together with as little as four bolts. This provides simple assembly for end users, but still allows the completed assembly to perform at higher pressures.

Figure 9:
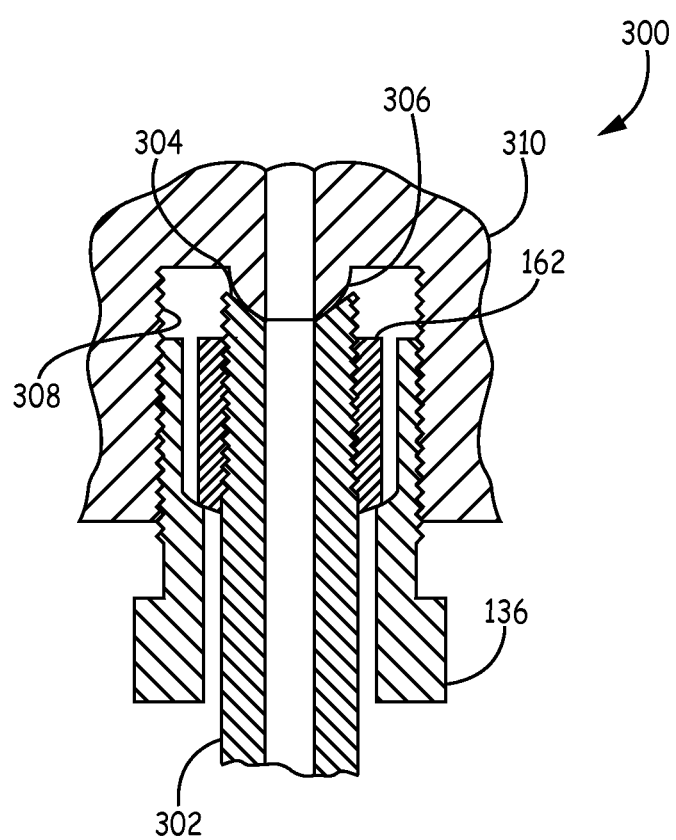
FIG. 9 is a diagrammatic view of a high pressure fluidic coupling in accordance with an embodiment of the present invention.

FIG. 9 is a diagrammatic view of a high pressure fluidic coupling in accordance with an embodiment of the present invention. FIG. 9 bears some similarities to FIG. 5, and like components are numbered similarly. High pressure coupling 300 includes a tube 302 having a conically-recessed end 304 that contacts spherical surface 306 of female fitting 308 in device 310. Coupling 300 includes thrust collar 162 and gland nut 136, much like the coupling illustrated with respect to FIG. 5. So arranged, tube 302 is allowed to be slightly axially misaligned with female fitting 308, but can still maintain a high-pressure seal. Spherical surface 306 can be manufactured or otherwise provided in any suitable manner. For example, surface 306 can be cast as part of device 310 or surface 306 can be provided by a ball having a passageway therethrough that is welded to device 310. Alternately, spherical surface 306 can be part of a metal-injection molded (MIM) insert that is welded within a bore in device 310.

Although the present invention has been described with reference to preferred embodiments, workers skilled in the art will recognize that changes may be made in form and detail without departing from the spirit and scope of the invention.

What is claimed is:

1. A process fluid pressure sensing system comprising:
    a process fluid pressure transmitter having first and second pressure inlets, the process fluid pressure transmitter being configured to obtain a measurement relative to pressures applied at the first and second pressure inlets and provide a process variable output based on the measurement;
    a process manifold operably coupled to a process fluid, the process manifold having first and second pressure outlets;
    a first high-pressure coupling joining the first pressure outlet of the process manifold to the first pressure inlet of the process fluid pressure transmitter, the first high-pressure fluid coupling being configured to accommodate misalignment between the first pressure outlet and the first pressure inlet, the first high pressure coupling including a tube having a tube end and a recess, and at least one of the tube end and recess has a spherical surface to accommodate misalignment between the first pressure outlet and the first pressure inlet; and
    a second high-pressure coupling joining the second pressure outlet of the process manifold to the second pressure inlet of the process fluid pressure transmitter, the second high-pressure fluid coupling being configured to accommodate misalignment between the second pressure outlet and the second pressure inlet.

2. The process fluid pressure sensing system of claim 1, wherein the first high-pressure coupling provides a metal-to-metal seal.

3. The process fluid pressure sensing system of claim 2, wherein the spherical surface bears against a conical recess to provide the metal-to-metal seal.

4. The process fluid pressure sensing system of claim 3, wherein the tube has a pair of ends, each being spherical and bearing against a respective conical recess to provide a pair of metal-to-metal seals.

5. The process fluid pressure sensing system of claim 4, wherein the process fluid pressure transmitter is bolted to the process manifold.

6. The process fluid pressure sensing system of claim 5, wherein the process fluid pressure transmitter is bolted to the process manifold by four bolts.

7. The process fluid pressure sensing system of claim 2, the tube having a conical recess that bears against the spherical surface portion to provide the metal-to-metal seal.

8. The process fluid pressure sensing system of claim 2, wherein the second high-pressure coupling provides a metal-to-metal seal.

9. The process fluid pressure sensing system of claim 8, wherein the second high-pressure coupling includes a tube having a spherical end that bears against a conical recess to provide a metal-to-metal seal.

10. The process fluid pressure sensing system of claim 1, wherein the process fluid pressure transmitter is separated from the process manifold, and wherein each of the first and second high-pressure couplings includes a straight tube.

11. The process fluid pressure sensing system of claim 10, wherein:
    the process fluid pressure transmitter has a female fitting having an axis;
    one of the straight tubes has a tube axis and includes a male fitting that is coupled to the female fitting; and
    the tube axis is misaligned with the axis of the female fitting.

12. The process fluid pressure sensing system of claim 11, wherein the misalignment exceeds 1 degree.

13. The process fluid pressure sensing system of claim 10, wherein the process fluid pressure transmitter is separated from the process manifold by a distance between 1.0 inches and 2.0 inches.

14. A process fluid pressure sensing system comprising:
    a process fluid pressure transmitter having at least one pressure inlet, the process fluid pressure transmitter being configured to obtain a measurement relative to pressure applied at the at least one pressure inlet and provide a process variable output based on the measurement;
    a process manifold operably coupled to a process fluid, the process manifold having at least one pressure outlet; and
    a high-pressure coupling joining the at least one pressure outlet of the process manifold to the at least one pressure inlet of the process fluid pressure transmitter, the high-pressure fluid coupling being configured to accommodate misalignment between the at least one pressure outlet and the at least one pressure inlet, the at least one high pressure coupling including a tube having a tube end and a recess, and at least one of the tube end and recess has a spherical surface to accommodate misalignment between the at least one pressure outlet and the at least one pressure inlet.

* * * * *